Aug. 5, 1958     C. ADLER, JR     2,845,721
SPACEOMETER WHICH INDICATES CAR LENGTHS REQUIRED
FOR STOPPING AT ANY GIVEN SPEED
Filed Dec. 29, 1955
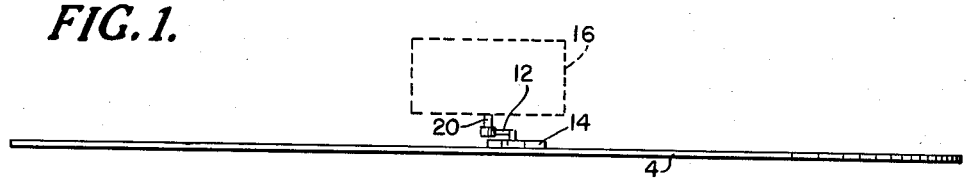
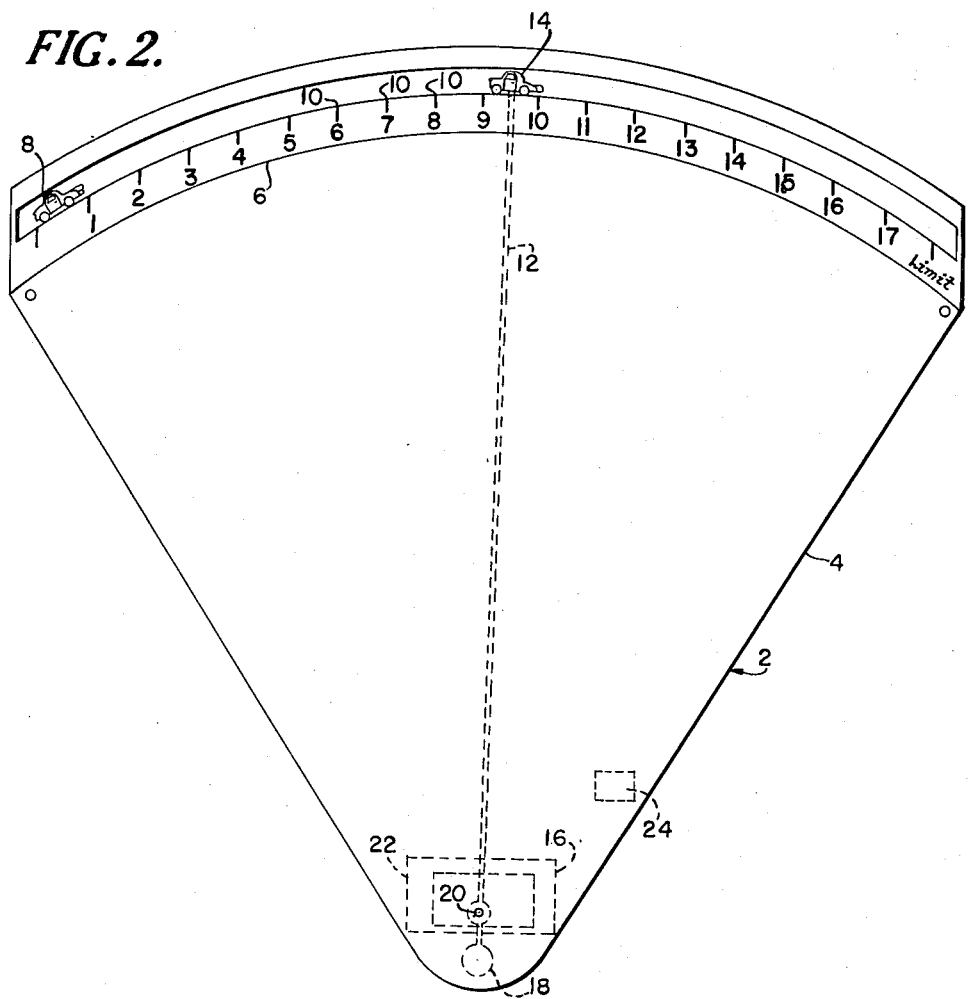
INVENTOR
CHARLES ADLER, JR.
BY
*Cushman, Darby & Cushman*
ATTORNEYS

United States Patent Office 2,845,721
Patented Aug. 5, 1958

2,845,721

SPACEOMETER WHICH INDICATES CAR LENGTHS REQUIRED FOR STOPPING AT ANY GIVEN SPEED

Charles Adler, Jr., Baltimore, Md.

Application December 29, 1955, Serial No. 556,263

2 Claims. (Cl. 35—11)

The present invention relates to improvements in safety means for an automobile and, more particularly, to a new spaceometer for automobiles.

It is an object of the present invention to reduce the number of rear end collisions between automobiles.

Another object is to devise a novel and effective spaceometer.

Still other objects of the invention will appear as the description progresses.

The invention both (1) educates drivers of motor vehicles in the proper spacing to be maintained between vehicles travelling on the roadway at varying specific speeds, and (2) compels such drivers to preserve a safe indicated spacing at any particular speed of travel. This assures that, with the exercise of reasonable alertness, the likelihood of rear end collisions and consequent piling up or chain reaction resulting from such collisions will be substantially reduced.

In my study of this very important and dangerous traffic problem, I found that mere explaining or indicating to a driver, that his car going at a specific speed can be stopped within a prescribed number of feet, was wholly inadequate. This is evidenced by the alarming increase in rear end collisions and piling up accidents occurring on vehicle roadways, particularly, turnpikes. It became apparent that the driver of a vehicle must be educated in a simple manner and have, at all times, permanently impressed on his mind (so that he will be aware and react with the same naturalness with which he operates the various mechanisms of his vehicle), the best way to avoid such conditions by maintaining a proper spacing between his and a preceding vehicle. I have found in actual practice that most drivers have a visual or photographic realization of a car length. It is something which the driver sees every day and does not require any mental effort or special depth perception training, such as is necessary in calculating distances in feet.

As a result of careful study and test, I have discovered that, if the driver is apprised of the car lengths which he should preserve between his vehicle and a preceding vehicle while he is driving at a specific speed, such driver naturally acquires a mental picture of the extent of such a distance and will, at all times, drive at a safe spacing distance.

The educational importance of the present invention can be understood from its practical significance, and by having it quite simple, the driver naturally comes to preserve the safe distance just as naturally as he applies the brake or blows his horn or operates any other instrumentality of his vehicle. This is the aim of the invention and represents one of the differences between success and failure in a safety means of this character.

Briefly, the present invention accomplishes the above aims by providing a spaceometer having a dial with a fixed car at one end thereof and a moveable car which moves back and forth across the dial as the speed increases or decreases and registers with one of the car length units into which the dial is divided, in order to advise the driver of the distance in car lengths required at his going speed to stop and avoid a rear end collision or pile up.

The number of car lengths in which a motor vehicle can be sopped increases with increase in speed. Consequently, it is possible, by having the movable car operatively connected to the drive shaft in the same manner in which a speedometer is so connected, to obtain directly a reading giving a fairly close approximation of the number of car lengths required to stop the car at the going speed. This approximation takes into account differences due to different types of roads, reflex actions of drivers, etc.

The above described spaceometer is simple and inexpensive to install in an automobile. If it is desired to obtain even greater accuracy, this can be accomplished in the following manner. Over a speed range of 10 to 70 miles per hour, the space required for a car to stop does not increase the same amount for each 10 miles per hour increase in speed, but, instead, the increase in stopping space required is about 1.3±0.1 more than the previous increase in space. This is shown in the following table:

| Speed (miles per hour) | 10 | 20 | 30 | 40 | 50 | 60 | 70 |
|---|---|---|---|---|---|---|---|
| car length required in which to stop | 0.9 | 2.2 | 4 | 6.5 | 9.7 | 13.4 | 17.7 |
| increase in car length required | 0.9 | 1.3 | 1.8 | 2.5 | 3.2 | 3.7 | 4.3 |
| ratio of increase in car length to previous increase in car lengths | | 1.4 | 1.4 | 1.4 | 1.3 | 1.2 | 1.2 |

The table above is for dry conditions. For wet conditions, while the stopping space in car lengths is increased, the above general ratio of increase in car lengths to the previous increase in car lengths still holds true.

Therefore, if it is desired to more accurately show the stopping space in car lengths required at any given speed with the above mentioned spaceometer, all that is required is the installation of a variable electrical resistance within the spaceometer, wherein the resistance is wound so as to be inversely proportional to the speed in the ratio of 1.3, as previously set forth.

As the ratio of increase in stopping space for wet roads is the same as for dry roads at any given increment in speed, all that is necessary to make the spaceometer accurate under wet road conditions is a device for increasing the tension on the balance spring of the spaceometer. This device can be brought into use merely by moving a switch or lever conveniently located on the dashboard or even on the face of the spaceometer.

Referring to the drawings:

Figure 1 is a top plan view of the spaceometer of the present invention;

Figure 2 is a front elevation of the spaceometer.

The spaceometer 2 includes a case 4 having an indicator dial 6 on the front of the case. A fixed car 8 facing left is at the left end of the indicator dial. The indicator dial has equally spaced markings 10 thereon, the distance between any two consecutive markings being equal to the length of the fixed car 8. The markings 10 are numbered from one, at the first marking, which is immediately to the right of the fixed car, up to any desired maximum number at the right end of the indicator dial. A rotatable indicator needle 12 is movable over the dial. At the end of the indicator needle 12 is a car 14 of the same length (and other dimensions) as the fixed car 8, which registers with the car length markings 10 to tell the driver the distance in car lengths required to stop the automobile at the going rate of speed. The rotatable indicator needle 12 is operatively connected with the drive shaft (not shown) of the automobile in a manner conventional with devices measuring speed rather than space.

The requisite mechanism is represented by box 16, a needle counterbalancing counterweight 18 and shaft 20. Thus, the spaceometer can include, in addition to the parts illustrated, a rotatable permanent magnet affixed to the shaft 20, which is adapted for connection through a cable (or flexible shaft) with a rotating part (e. g., the drive shaft) of the motor of the automobile, and a cup, operating as an armature and rotatable by magnetic attraction of said magnet. Indicator needle 12 is resiliently connected with and rotated by said cup through a sensitive spiral balance spring, so as to render the indicator needle 12 highly sensitive to speed variations transmitted from the automobile to and through the magnet driven cup, whereby changes in the stopping space in car lengths are indicated.

Preferably, the indicator needle 12 is concealed from view, except for the car 14, at the end thereof, so that nothing distracts from measuring the number of car lengths required to stop.

As previously set forth, the spaceometer can be modified to give a more accurate measurement of stopping space by including a variable resistance 22 and can also be modified to provide for wet road conditions by including a switch 24, whereby the tension on the balance spring is adjusted to wet road conditions by moving the switch so that the movable car 14 goes more rapidly over the face of the indicator dial at the same rate of automobile speed.

The spaceometer can be positioned at any convenient position on the dashboard of the automobile.

In place of the indicator needle there can be used other indicator means such as discs or other mechanism. Similarly, in place of the cars there can be used rectangles of light, or arrows or other symbols to represent the length of a car.

I claim:

1. A spacing indicating unit adapted to be coupled with the drive shaft of an automobile whereby stopping space is recorded as a function of the speed of the automobile, said spacing indicating unit comprising an indicator dial, a fixed first body at one end of said dial, equally spaced markings along said dial, the distance between each of said markings being substantially equal to the length of said fixed first body, a rotatable indicator means movable over said dial, and a second body of substantially equivalent dimensions to said first body and carried by said indicator means whereby said second body registers in car lengths the space necessary to stop the automobile at the speed the automobile is going.

2. A spacing indicating unit as defined in claim 1 wherein said bodies are representations of automobiles.

References Cited in the file of this patent

UNITED STATES PATENTS

| | | |
|---|---|---|
| 942,497 | Harris | Dec. 7, 1909 |
| 977,703 | Brown | Dec. 6, 1910 |
| 1,083,525 | Evans | Jan. 6, 1914 |
| 1,984,082 | Read | Dec. 11, 1934 |
| 2,267,504 | Morley et al. | Dec. 23, 1941 |
| 2,347,613 | Rodanet | Apr. 25, 1944 |
| 2,535,484 | Conroy | Dec. 26, 1950 |